Patented Nov. 30, 1926.

1,608,700

UNITED STATES PATENT OFFICE.

BURRITT SAMUEL LACY, OF RED BANK, NEW JERSEY, ASSIGNOR TO THE ROESSLER & HASSLACHER CHEMICAL COMPANY, OF NEW YORK, N. Y., A CORPORATION OF NEW YORK.

METHOD FOR THE PRODUCTION OF HYDROCYANIC ACID.

No Drawing.    Application filed February 20, 1926. Serial No. 89,781.

This invention relates to the formation of hydrocyanic acid by the thermal decomposition of formamide. The reaction is represented by the equation $HCONH_2 + 29,000$ calories $= HCN + H_2O$.

The great difficulty in applying this reaction on a commercial scale is caused by the fact that the reaction is so highly endothermic. The reaction must be controlled both as to duration of exposure of the reaction materials to the contact at the general temperature employed, and as to avoidance of local overheating. This control is essential, in order that a high proportion of the raw material shall react at the optimum temperature without at the same time experiencing unnecessarily high losses from the production of $CO + NH_3$ by the reaction $HCN + H_2O \rightarrow CO + NH_3 + 10,000$ calories, which will occur if the time of exposure is too great for the temperature used or if there are local "hot spots" in the contact.

With a laboratory scale reaction tube inserted in a furnace, there is such a relatively high ratio of tube wall surface to the tube volume as to cause no difficulty in furnishing the 29,000 gram calories per gram molecule of formamide required for the reaction proper, or about 40,000 gram calories including the heating up of the formamide vapor to the reaction temperature. However to carry out the same idea on a large scale means a multitubular construction for the reaction vessel, which would be very clumsy, and expensive in first cost, besides raising the problem of getting uniform temperatures and uniform flow rates in all of the parallel tubes; furthermore, to make the apparatus of refractory and noncorrosive material still further increases the technical difficulties of construction.

I have now discovered a simple and convenient method of carrying out the desired reaction on a large scale and in a single tube or furnace in such a way that the necessary heating is brought about uniformly, rapidly, conveniently and cheaply, with almost perfect control both as to general temperature range and avoidance of local hot spots, and as to uniformity of time of exposure of the reaction material. The method used consists essentially of mixing the formamide, preferably already vaporized, with a relatively very large proportion, for example 20 volumes per volume formamide vapor, of a substantially inert gas or vapor which has previously been brought to a high temperature, for example 900° C., considerably exceeding the final temperature, for example, 600° C., at which it is desired to keep the outlet end of the reaction contact, and then passing the mixture of formamide and added gas into the contact material. I preferably do not supply heat direct to the contact mass. I have found that not only does the use of this added heating gas solve the above indicated problems of heating and of uniformity of time and temperature, but in addition higher yields of HCN are obtained than when no added gas is used.

Almost any gas such as nitrogen, for example, which has no serious prejudicial chemical action may be employed as the inert gas. By utilizing the mixture of CO, $H_2$ and $N_2$ which is produced in small amount as a by-product in the decomposition of $HCONH_2$, the expense of a separate supply of $N_2$ is avoided.

The method, however, which I prefer to use to produce a supply of hot, substantially inert, gas is as follows:

Fuel gas, for example, producer gas, is mixed with a proportion of air such that the oxygen in the mixture is substantially that which is theoretically sufficient to burn the combustible constituents completely and the mixture is then passed through an incandescent refractory contact and burned, thus producing a hot gas which is practically oxygen-free. This hot gas is then lowered to the desired temperature, either by water cooling or by mixing it with proper proportion of final process off gas which has been recirculated from the outlet of the scrubbers which remove the HCN. The total volume of diluting gas thus produced, which may be for example 20 volumes of gas at a temperature of, for example 700° C., is then mixed with the equivalent of 1 volume of formamide vapor, which may be either actually already in the form of vapor or may be a fine spray of liquid formamide, and the whole passes on into the reaction contact mass. Both the incandescent refractory contact and the reaction contact are for simplicity preferably located within the same refractory lined thermally insulated furnace. The contact material may be any catalyst which favors the formation of hydrocyanic acid and water in reference to the formation of carbon monoxide and ammonia from formamide. Examples of such catalysts are copper, either as gauze or as reduced metal on a carrier, thorium oxide deposited on pumice, or pumice itself. The off gas leaves the reaction contact at a temperature which for the above indicated conditions may be about 400° C., and is then cooled down and suitably treated to remove its content of HCN. The treatment may consist for example of scrubbing the off gas first with hot dilute sulphuric acid to fix any ammonia and unreacted formamide, followed by a water scrubber to absorb the HCN content of the off gas, pure HCN being then recovered from the water solution by distillation.

I have indicated a temperature of 700° C. for the inert heating gas and 400° C. for the exit temperature after the decomposition of the formamide. These temperatures are however merely illustrative. I have found that the decomposition of the formamide takes place most satisfactorily within a range of temperature from about 300° C. to about 800° C. This means that the final exit temperature from the catalyst should be within this range and preferably at about 400° C. I therefore adjust the gas temperature relative to the volume used so as to attain my preferred exit temperature. In order to secure these exit temperatures several adjustments can be made:

1. The temperature of the hot inert gas before mixing with the formamide may be varied. The combustion of the flue gas will usually give an inert gas temperature of above 1000° C., which may be lowered to the desired temperature either by water-cooling or by admixture with recirculated process off gas. Thus for example if we use an inert gas at 900° C. instead of 700° C. the final exit temperature will be about 600° C. instead of 400° C. Gas temperatures less than 500° C. will give poorer results than higher temperatures. They will, however, produce HCN.

2. The relative volumes of the inert heating gas and the formamide vapor can be varied. Whereas, with a gas temperature of 700° C., I have used 20 volumes to one of formamide, with the same gas temperature I could use 15 volumes of the hot gas, to one of formamide. This change would cause less heat to be brought to the reaction and the exit temperature would consequently be lower, i. e. around 300° C. instead of 400° C. obtained with 20 volumes. Or, on the other hand, the volume of hot gas could be increased. I have found that in general it is not desirable to use less than 5 volumes of added gas per volume formamide, since the temperature of the inert gas must then be extremely high to give the best exit temperature of about 400° C.

3. Combinations of 1 and 2 may be made. Thus, if for example, it is desired to use 15 instead of 20 volumes of inert gas and yet maintain an exit temperature of 400° C., this may be attained by having the 15 volumes of inert gas at about 800° C. instead of 700° C. before mixing with the formamide.

The following examples illustrate two embodiments of my invention:

Example I.

A mixture of one volume formamide vapor and two volumes of nitrogen was passed over a contact of pumice impregnated with about 12% of its weight of thorium dioxide. At a temperature of 395° C. for the mixed vapors and a space velocity of 660 cc. per hour (at N. T. P.) of gas mixture per cc. of contact filled space a yield of 67% of theory of hydrocyanic acid was obtained. The above space velocity was calculated as if the gas was at normal temperature and pressure (N. T. P.). In order to obtain the actual space velocity at the pressure and temperature used merely convert the 660 cc. by the necessary volume correction factor.

A similar test with no diluent gas gave a 60% yield.

Example II.

A mixture of one volume formamide vapor and 9 volumes preheated nitrogen was passed over a contact composed of granular pumice; the average temperature through the reaction zone was about 670° C. At a space velocity per hour of 1100 a yield of 92% of theory of hydrocyanic acid was obtained.

The exact temperatures required depend considerably on the type of catalyst or contact employed and I do not desire to be limited to any definite temperatures of the heating gas, the formamide, the contact, or the reaction products or definite volumes of gases.

What I claim is:

1. In a process for manufacturing hydrocyanic acid by the thermal decomposition of formamide in the presence of a catalyst capable of causing the formation of hydrocyanic acid and water from said formamide, the step of causing vapors of the formamide to be mixed with several volumes of substantially inert heating gas at a temperature above 500° C. before its contact with said catalyst.

2. In a process for manufacturing hydrocyanic acid by the thermal decomposition of formamide in the presence of a catalyst capable of causing the formation of hydrocyanic acid and water from said formamide, the step of causing vapors of the formamide to be mixed with at least five volumes of substantially inert, hot gas before its contact with said catalyst.

3. In a process for manufacturing hydrocyanic acid by the thermal decomposition of formamide in the presence of a catalyst capable of causing the formation of hydrocyanic acid and water from said formamide, the step of causing vapors of the formamide before its contact with said catalyst to be mixed with several volumes of substantially inert, hot gas obtained by burning a fuel gas with substantially theoretical amount of air.

4. In a process for manufacturing hydrocyanic acid by the thermal decomposition of formamide in the presence of a catalyst capable of causing the formation of hydrocyanic acid and water from said formamide, the step of causing vapors of the formamide before its contact with said catalyst to be mixed with from 5 to 20 volumes of substantially inert, hot gas at a temperature above 500° C. obtained by burning a fuel gas with substantially theoretical amount of air.

5. In a process for manufacturing hydrocyanic acid by the thermal decomposition of formamide in the presence of a catalyst capable of causing the formation of hydrocyanic acid and water from said formamide, the step of causing vapors of the formamide before its contact with said catalyst to be mixed with about 10 volumes of substantially inert, hot gas at a temperature of about 800° C. obtained by burning a fuel gas with substantially theoretical amount of air.

6. A method of producing hydrocyanic acid from formamide by thermal decomposition in the presence of a contact mass, comprising mixing vapors of said formamide with such excess of an inert hot gas at such a temperature as to maintain a reaction temperature of between 300° C. and 800° C. and passing the mixture over said contact mass without applying any other heat either to the mixed gases or the contact material.

7. A method of producing hydrocyanic acid from formamide by thermal decomposition in the presence of a contact mass, comprising mixing vapors of said formamide with such excess of an inert hot gas at such a temperature above 500° C. as to maintain a reaction temperature of between 300° C. and 800° C. and passing the mixture over said contact mass without applying any other heat either to the mixed gases or the contact material.

8. A method of producing hydrocyanic acid from formamide by thermal decomposition in the presence of a contact mass, comprising mixing vapors of said formamide with such excess of an inert hot gas at such a temperature as to maintain a reaction temperature of about 400° C. and passing the mixture over said contact mass without applying any other heat either to the mixed gases or the contact material.

9. A method of producing hydrocyanic acid from formamide by thermal decomposition in the presence of a contact mass, comprising mixing vapors of said formamide with such excess of an inert hot gas at such a temperature above 500° C. as to maintain a reaction temperature of about 400° C. and passing the mixture over said contact mass without applying any other heat either to the mixed gases or the contact material.

10. A method of producing hydrocyanic acid from formamide by thermal decomposition in the presence of a contact mass comprising mixing vapors of said formamide with such excess of an inert hot gas at such a temperature above 400° C. as to transfer more than 29,000 calories of heat to each mole of said formamide.

11. A method of producing hydrocyanic acid from formamide by thermal decomposition in the presence of a contact mass comprising mixing vapors of said formamide with such excess of an inert hot gas at such a temperature above 400° C. as to transfer more than 29,000 calories of heat to each mole of said formamide and also to maintain the temperature of the exit gases after reaction at a temperature of not less than 400° C.

12. A process for the manufacture of hydrocyanic acid by the thermal decomposition of formamide in the presence of a catalyst comprising supplying the total heat required for said decomposition by mixing a hot inert gas with the formamide vapor and passing the mixture over said catalyst.

Signed at Perth Amboy in the county of Middlesex and State of New Jersey this 18th day of February A. D. 1926.

BURRITT SAMUEL LACY.

DISCLAIMER 1,608,700.—*Burritt Samuel Lacy*, Red Bank, N. J. METHOD FOR THE PRODUCTION OF HYDROCYANIC ACID. Patent dated November 30, 1926. Disclaimer filed September 22, 1933, by the assignee, *E. I. du Pont de Nemours & Company*.

Hereby enters this disclaimer to that part of the claims of said Letters Patent which is in the following words, to wit:

"12. A process for the manufacture of hydrocyanic acid by the thermal decomposition of formamide in the presence of a catalyst comprising supplying the total heat required for said decomposition by mixing a hot inert gas with the formamide vapor and passing the mixture over said catalyst."

[*Official Gazette October 17, 1933.*]